US009283833B2

United States Patent
Kopp et al.

(10) Patent No.: US 9,283,833 B2
(45) Date of Patent: Mar. 15, 2016

(54) TOP OF A CONVERTIBLE VEHICLE HAVING A ROOF CASSETTE AND A SEALING ARRANGEMENT

(71) Applicant: Webasto-Edscha Cabrio GmbH, Stockdorf (DE)

(72) Inventors: Georg Kopp, Plattling (DE); Magnus Sviberg, Deggendorf (DE); Jason Bowles, Owosso, MI (US); Alexander Haimerl, Bogen (DE)

(73) Assignee: WEBASTO-EDSCHA CABRIO GMBH, Stockdorf (DE)

( * ) Notice: Subject to any disclaimer, the term of this patent is extended or adjusted under 35 U.S.C. 154(b) by 0 days.

(21) Appl. No.: 14/465,462

(22) Filed: Aug. 21, 2014

(65) Prior Publication Data

US 2015/0224861 A1 Aug. 13, 2015

Related U.S. Application Data

(63) Continuation-in-part of application No. 14/178,010, filed on Feb. 11, 2014.

(51) Int. Cl.
*B60J 7/02* (2006.01)
*B60J 7/20* (2006.01)
*B60J 7/06* (2006.01)

(52) U.S. Cl.
CPC ... *B60J 7/20* (2013.01); *B60J 7/061* (2013.01)

(58) Field of Classification Search
CPC .................................. B60J 7/061; B60J 7/20
USPC ............ 296/216.01–224, 219, 107.19, 107.2, 296/218
See application file for complete search history.

(56) References Cited

U.S. PATENT DOCUMENTS

| 3,021,174 | A | * | 2/1962 | Rund | 296/107.2 |
|---|---|---|---|---|---|
| 5,018,783 | A | * | 5/1991 | Chamings et al. | 296/219 |
| 5,018,784 | A | * | 5/1991 | Yokouchi et al. | 296/219 |
| 5,052,747 | A | * | 10/1991 | Kubota et al. | 296/219 |
| 6,267,433 | B1 | * | 7/2001 | Bayer et al. | 296/121 |
| 6,398,296 | B1 | * | 6/2002 | Mayer | 296/219 |
| 6,435,606 | B1 | | 8/2002 | Miklosi et al. | |
| 6,443,519 | B1 | * | 9/2002 | Betzl | 296/213 |
| 6,916,061 | B2 | | 7/2005 | Obendiek | |
| 7,748,776 | B2 | * | 7/2010 | Miyajima et al. | 296/219 |
| 7,815,253 | B2 | * | 10/2010 | Kanamori | 296/219 |
| 2009/0102244 | A1 | * | 4/2009 | Kanamori | 296/219 |

FOREIGN PATENT DOCUMENTS

DE   19704173 C1   4/1998
DE   19939724 C1   8/1999

(Continued)

*Primary Examiner* — Dennis H Pedder
(74) *Attorney, Agent, or Firm* — Fitch, Even, Tabin & Flannery LLP

(57) ABSTRACT

A top for a convertible vehicle having at least one roof element, which is displaceable in relation to a vertical longitudinal center plane of the roof, is guided slidably in the longitudinal direction of the roof on both sides at one guide rail, respectively, said guide rail being arranged at a respective lateral roof beam, a rear roof cassette being displaceable between an erected position for adjoining, in the rear, to the lateral roof beams in the longitudinal direction of the roof and a storage position that is lowered with respect to the former position and the roof cassette accommodating the roof element in the uncovering position thereof, as well as a sealing arrangement that is arranged in the region of the roof opening and seals a vehicle interior off with respect to a vehicle environment in the closed position of the roof element.

14 Claims, 6 Drawing Sheets

(56) References Cited

FOREIGN PATENT DOCUMENTS

| DE | 19927234 | C1 | 7/2000 |
| DE | 19938605 | C1 | 10/2000 |
| DE | 19943765 | C1 | 3/2001 |
| DE | 1024773 | B4 | 7/2004 |
| DE | 102004017569 | C1 | 11/2006 |
| DE | 102004017327 | C1 | 9/2008 |

\* cited by examiner

TOP OF A CONVERTIBLE VEHICLE HAVING A ROOF CASSETTE AND A SEALING ARRANGEMENT

CROSS-REFERENCE TO RELATED APPLICATIONS

This application is a continuation-in-part of U.S. Non-Provisional patent application Ser. No. 14/178,010, filed on Feb. 11, 2014, and entitled "MODULAR ROOF ASSEMBLIES FOR VEHICLES". The priority of the prior application is expressly claimed, and the disclosure of this prior application is hereby incorporated by reference in its entirety.

TECHNICAL FIELD

This disclosure relates to vehicle convertible tops and in particular, to a vehicle convertible top having a roof cassette and a sealing arrangement.

BACKGROUND

A vehicle construction having a top, which is displaceable between a closed position spanning a vehicle interior and an uncovering position for uncovering the vehicle interior to the top, is known, for example, from document DE 199 39 724 C1. Said top comprises a rear roof cassette limiting, in the rear, a folding roof portion that constitutes a roof element, which portion, for spanning a vehicle interior, can be unfolded or extended as far as to a front apron of the vehicle, closing a roof opening in this way. In its uncovering position, the folding roof portion is accommodated by the rear roof cassette, which can then be stored in a rear storage space of the relevant vehicle through pivoting. Hereunto, the roof cassette is usually connected to the vehicle body via a link arrangement.

Furthermore, it is known to provide tops with a sealing arrangement for sealing a vehicle interior off with respect to a vehicle environment. In a top of the above-described type, it is required that the roof element sealingly abuts against the lateral roof beams and that the rear roof cassette sealingly abuts against the lateral roof beams in its erected position.

SUMMARY

Vehicle tops for convertibles are described herein having optimized sealing options comprising at least one roof element, which is displaceable between a closed position closing a roof opening and an uncovering position for uncovering said roof opening and which, in relation to a vertical longitudinal center plane of the roof, is guided slidably in the longitudinal direction of the roof on both sides at one guide rail, respectively, said guide rail being arranged at a respective lateral roof beam, and a rear roof cassette being displaceable between an erected position for adjoining, in the rear, to the lateral roof beams in the longitudinal direction of the roof and a storage position that is lowered with respect to the former position and the roof cassette accommodating the roof element in the uncovering position thereof, as well as a sealing arrangement that seals a vehicle interior off with respect to a vehicle environment in the closed position of the roof element and in the erected position of the roof cassette. The sealing arrangement, on both sides of a vertical longitudinal center plane of the roof, comprises one inner beam sealing portion, respectively, which is arranged at the relevant lateral roof beam on the side of the roof opening, and, in the rear, one cassette sealing portion, respectively, which is arranged at the roof cassette, and which comprises one transverse sealing portion extending in the transverse direction of the roof and one longitudinal sealing portion extending in the longitudinal direction of the roof.

This means that a two-part sealing arrangement exists in the top according to this disclosure, wherein the beam sealing portion is fixed to the lateral roof beam and the cassette sealing portion is fixed to the roof cassette and interacts with corresponding sealing surfaces of the relevant lateral roof beam. Consequently, as compared to known sealing arrangements, an improved sealing can be achieved.

In particular, an optimized sealing is achieved through the sealing arrangement if the cassette sealing portions, in the erected position of the roof cassette, abut against relevant abutment surfaces of the respective lateral roof beam from below. Consequently, sealing lips of the cassette sealing portion substantially stand vertically, which, in turn, enables reliable sealing even if the abutment surface or the sealing surface are slightly uneven. Consequently, the roof cassette can be advanced at the relevant lateral beam from the rear below.

In order to achieve a continuous sealing between the roof element and the lateral roof beams in the closed position of the roof element, in a special embodiment of the top according to this disclosure, the longitudinal sealing portions, in the erected position of the roof cassette, are aligned with the respective inner beam sealing portions.

In order to be able to discharge any water, which might emerge, from the sealing region, the inner beam sealing portions and the cassette sealing portions preferably include one water channel, respectively.

The water channels are preferably limited by one outer sealing lip, respectively, which sealingly abuts against the respective lateral roof beam, and by one inner sealing lip, respectively, which sealingly abuts against the roof element.

In order to preclude leakages in the sealing system, the longitudinal sealing portions preferably are designed in one piece with the respective transverse sealing portions. For example, the longitudinal sealing portions, in the rear, merge into a transverse sealing portion at right angles, respectively, wherein the transverse sealing portions, on the outer side, in relation to the vertical longitudinal center plane of the roof, can include one end portion, respectively, which extends towards the bottom, that means downwards. Consequently, the transverse sealing portion can follow the cross-section of the relevant lateral roof beam, guaranteeing a reliable sealing in this way.

In addition, it is conceivable that the inner beam sealing portions are designed in one piece with a front beam sealing portion, respectively, which, in the longitudinal direction of the vehicle, limits the corresponding lateral beam in the front and with an outer beam sealing portion, respectively, which is arranged at the outer side of the corresponding lateral roof beam and which is embodied for abutting against a door seal, a body part or a side window. The sealing arrangement consequently at least partially reaches around the lateral roof beam in question like a frame.

For enlarging the accommodation space for the roof element and also for optimizing the sealing characteristics, the guide rails, on both sides of the longitudinal center plane of the roof, can comprise one beam guide portion, respectively, which is arranged at the relevant lateral roof beam, and one cassette guide portion, respectively, which is arranged at the roof cassette, wherein the beam guide portions, in their rear region, are respectively shorter in the longitudinal direction of the roof than the corresponding lateral roof beam.

Expediently, in the erected position of the roof cassette, the respective cassette guide portion and the respective beam guide portion are aligned, that means the relevant beam guide portion directly adjoins the relevant cassette guide portion.

In accordance with a further aspect of the present embodiments, a top for a convertible vehicle is proposed, comprising at least one roof element, which is displaceable between a closed position closing a roof opening and an uncovering position for uncovering said roof opening and which, in relation to a vertical longitudinal center plane of the roof, is guided slidably in the longitudinal direction of the roof on both sides at one guide rail, respectively, said guide rail being arranged at a respective lateral roof beam, and a rear roof cassette being displaceable between an erected position for adjoining, in the rear, to the lateral roof beams in the longitudinal direction of the roof and a storage position that is lowered with respect to the former position and the roof cassette accommodating the roof element in the uncovering position thereof. The guide rails comprise one beam guide portion, respectively, which is fixed to the relevant lateral roof beam, and one cassette guide portion, respectively, which is fixed to the roof cassette, wherein the beam guide portions, in their rear region, as viewed in the longitudinal direction of the roof, are respectively shorter than the corresponding lateral roof beam.

Further advantages and advantageous configurations of the subject-matter of the present embodiments can be taken from the description, from the drawing and from the claims.

DETAILED DESCRIPTION

Figure 1:
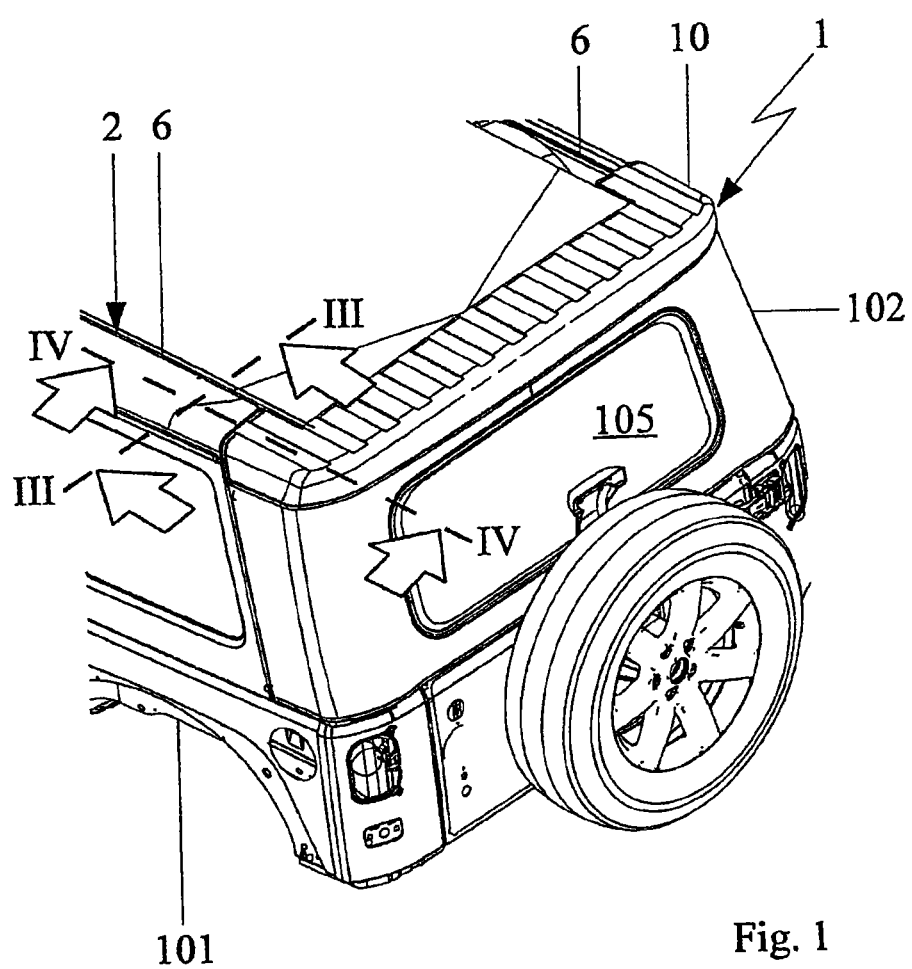
FIG. 1 shows a rear region of a vehicle construction having a displaceable top in the closed position thereof.

In the drawings, a vehicle construction 1 is illustrated, which is part of a passenger car that is designed as an off-road vehicle here. The vehicle construction 1 comprises a body 101, on which a displaceable top 102 is arranged, by means of which top a vehicle interior can either be closed or at least partially uncovered to the top.

The top 102 comprises a roof element 2, which can be regarded as a folding roof portion forming the actual vehicle roof in its closed position and being designed, in the usual manner, with a roof tip 103 and transverse bows 104. Said transverse bows, on the one hand, constitute guide bows and, on the other hand, folding bows.

For guiding the roof tip 103 and the guide bows, that means for guiding the roof element 2, the top 102, in relation to a vertical longitudinal center plane of the roof, includes one guide rail 8 respectively on both sides, said guide rail laterally limiting a roof opening 4, which can be closed or at least partially uncovered by means of the roof element 2.

At its rear side, the roof element 2 is connected to a roof cassette 10, which accommodates a displacing mechanism for the roof element 2 and forms a rear corner region of the top 102 or of the vehicle roof in the closed position. The roof cassette 10 is linked to the body 101 via a linkage, which is not illustrated in more detail here. Additionally, the top 102, in a region situated below the roof cassette 10 in the closed position, comprises a rear window 105, which is displaceably embodied.

In order to move the top 102 from the closed position illustrated in FIG. 1 into a storage position, the roof element 2 is initially advanced into the roof cassette 10 in the rear direction, such that the same can be lowered into a storage position together with the roof element 2, for being accommodated in a rear top storage space. In order to be able to perform the lowering movement, the rear window 105 is swung forward.

Figure 2:
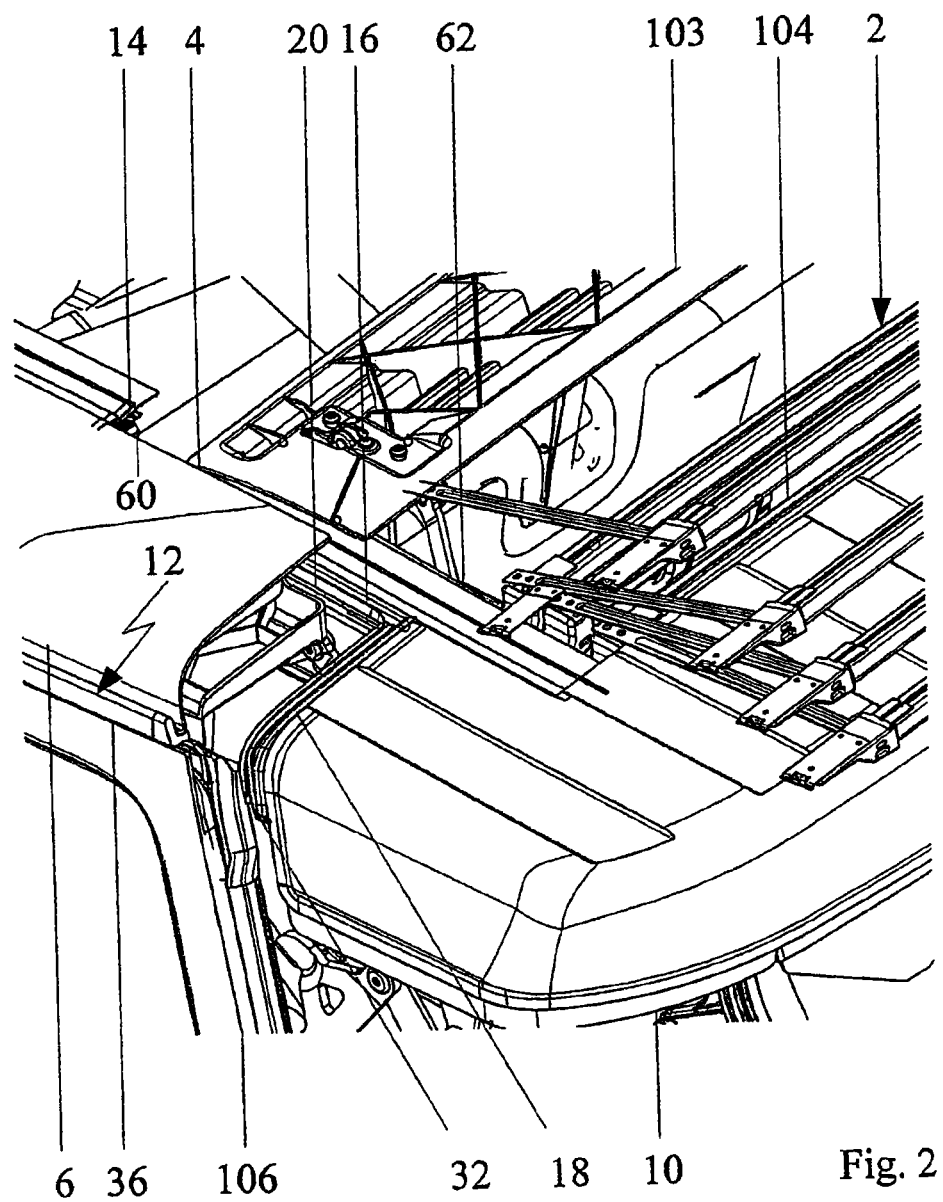
FIG. 2 shows an enlarged cut-out of the rear region in a position of the top which is partially open.
Figure 3:
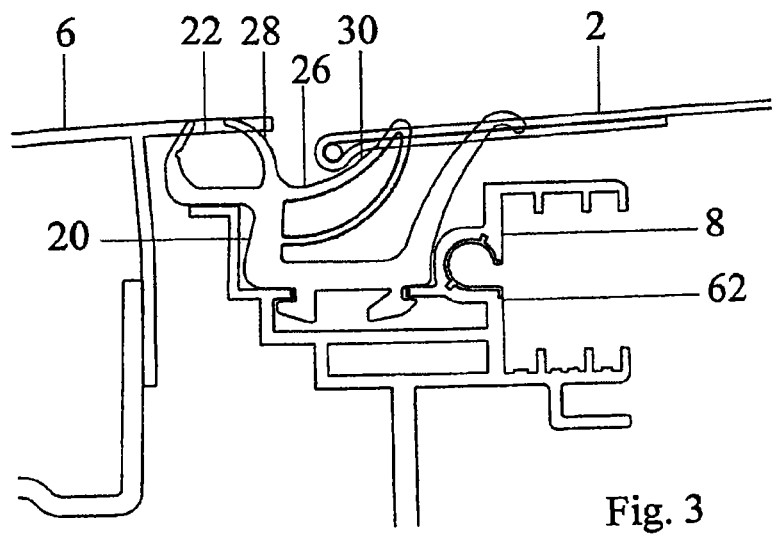
FIG. 3 shows a section through a lateral roof beam and a rear roof cassette in the transverse direction of the vehicle along line III-Ill in FIG. 1.
Figure 4:
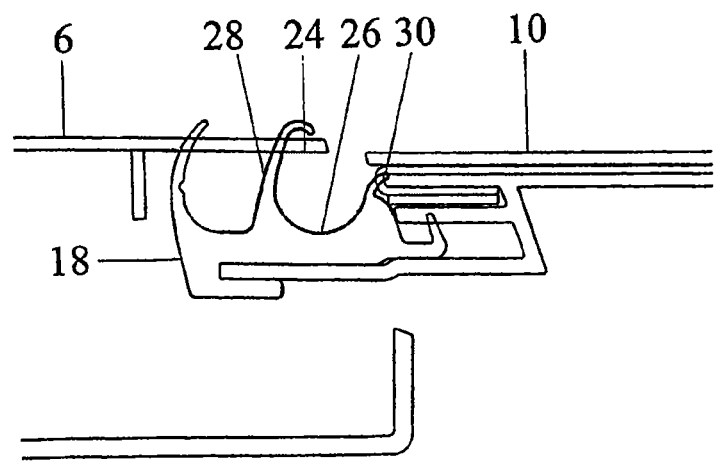
FIG. 4 shows a section through the lateral roof beam and the rear roof cassette in the longitudinal direction of the roof along line IV-IV in FIG. 1.

As it can in particular be taken from FIG. 2, the guide rails 8 are respectively designed so as to be divided into two parts, to be more precise, they consist of a so-called beam guide portion 60 which is arranged and attached at the inner side of the relevant lateral roof beam 6, and of a so-called cassette guide portion 62 which is fixed at the roof cassette 10 and which projects to the front in the front direction of the vehicle, starting from a rear cassette body. The beam guide portion 60 of the respective guide rail 8, as it can also be taken from FIG. 2, is designed so as to be shorter than the relevant lateral roof beam 6, that means the rear face side of the beam guide portion 60 is arranged toward the front with respect to the rear face side of the relevant lateral roof beam 6. The cassette guide portion 62 of the relevant guide rail 8 projects beyond the cassette body to the front to an extent such that the distance between the rear face side of the beam guide portion 60 and the rear face side of the lateral roof beam 6 can be bridged. In the lifted erected position of the roof cassette 10 which is illustrated in FIG. 1, the beam guide portion 60 and the cassette guide portion 62 are aligned. Consequently, the corresponding guide tracks of the two portions directly merge into one another and a problem-free guiding of the roof element 2 in the guide rails 8, which are arranged on both sides, is guaranteed. This means that the cassette guide portions 62 directly adjoin the beam guide portions 60 in the erected position of the roof cassette 10.

Through the cassette guide portions 62 of the guide rails 8, the roof cassette 10, which portions are provided with a centering element, can positionally accurately from below be moved into the erected position against the lateral roof beams 6.

In order to seal the vehicle interior off with respect to the vehicle environment, the top 102 is provided with a sealing arrangement 12 which comprises a series of sealing portions.

Figure 5:
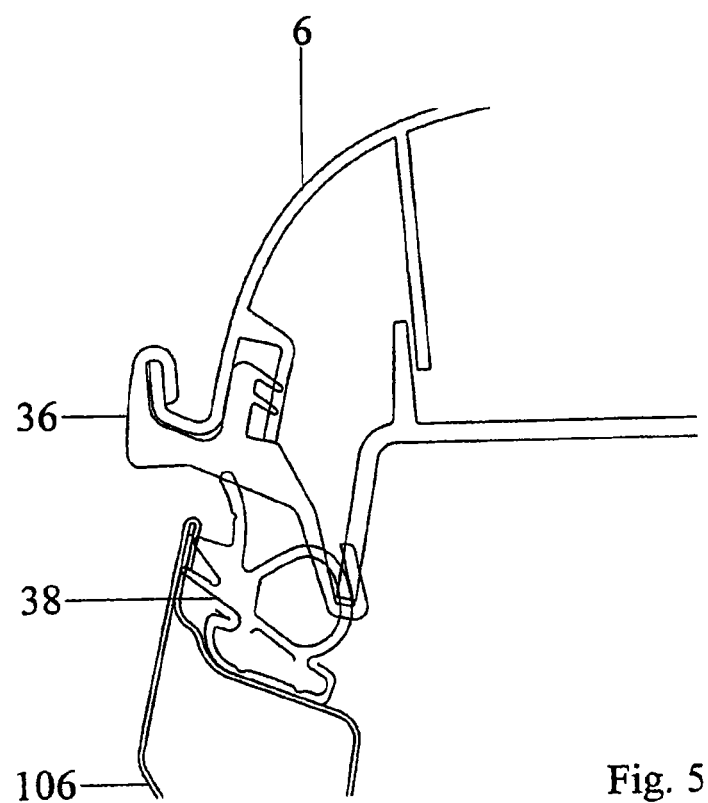
FIG. 5 shows a further section in the transverse direction of the roof in the region of a side window.
Figure 6:
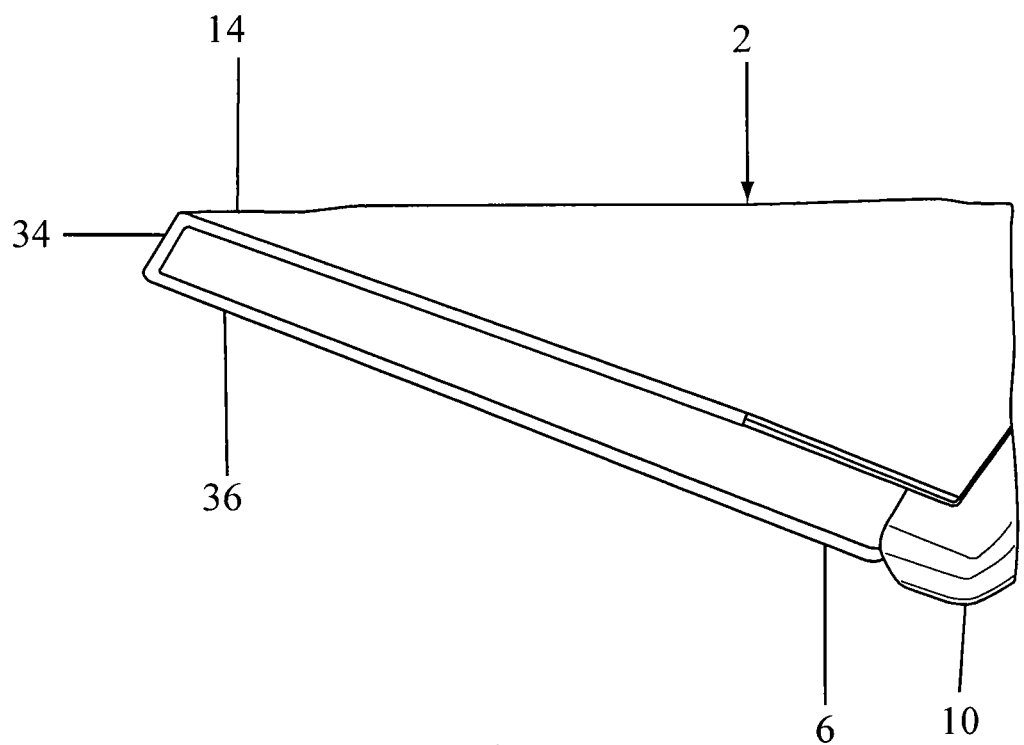
FIG. 6 shows a perspective top view onto a lateral roof beam.
Figure 7:
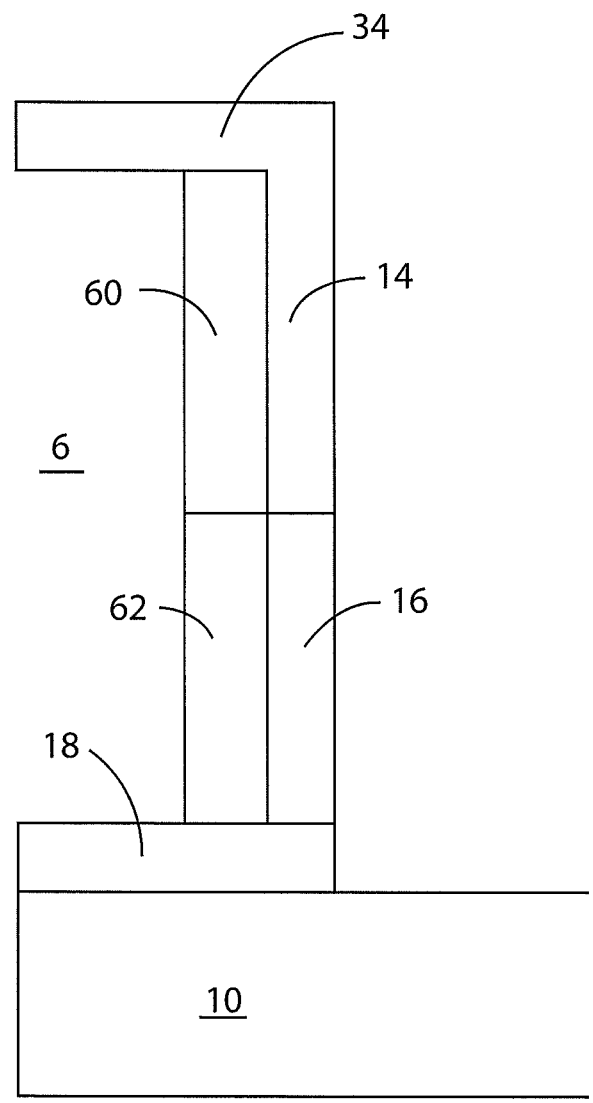
FIG. 7 shows a top plan view onto a lateral roof beam.

On the one hand, the sealing arrangement 12 includes an inner beam sealing portion 14 which follows the beam guide portion 60 of the respective guide rail 8 and on which the roof element 2 rests in its closed position. The inner beam sealing portion 14, as it can be taken from FIGS. 5 and 6, is designed in one piece with a front beam sealing portion 34 which, in the longitudinal direction of the roof, limits the lateral roof beam 6 in the front, and with an outer beam sealing portion 36 which is arranged at the outer side of the corresponding lateral roof beam 6 and against which a seal 38 abuts. The seal 38 is designed as a hollow chamber seal and is arranged at or fixed to an upper edge of a side window 106 which can be mounted separately. A corresponding seal 38 can also be arranged at an upper edge of a vehicle door. The outer beam sealing portion 36 includes a latching profile which engages with a corresponding pocket of the relevant lateral roof beam 6, wherein, at the edges of the beam sealing portion 36, retaining tabs are designed which reach over corresponding edges of the lateral roof beam 6.

On the other hand, the sealing arrangement 12 of the top 102, in relation to the vertical longitudinal center plane of the roof, comprises one cassette sealing portion 16 on both sides for the relevant lateral roof beam 6, respectively, said portion being formed by a transverse sealing portion 18 running in the transverse direction of the roof and by a longitudinal sealing portion 20 running in the longitudinal direction of the roof. The cassette sealing portion 16 is designed in one piece and is fixed to the roof cassette 10. The longitudinal sealing portion 20 is fixed to the cassette guide portion 62 via corresponding retaining feet and the transverse sealing portion 18 is fixed to a corresponding tab of the roof cassette 10 via a bottom recess. As it can in particular be taken from FIG. 2, the transverse sealing portion 18 and the longitudinal sealing portion 20 are oriented at right angles with respect to each other here. The transverse sealing portion 18 includes an outer end portion 32 which extends towards the bottom, that means downwards, and which follows the shape of an outer shell of the lateral roof beam 6. In the erected position of the roof cassette 10, the transverse sealing portion 18, via a bottom sealing surface 24, abuts against the outer shell of the lateral roof beam 6 from below. The longitudinal sealing portion 20, via a sealing surface 22, abuts against the outer shell of the lateral roof beam 6 from below.

In the erected position of the roof cassette 10, the longitudinal sealing portions 20 are aligned with the beam sealing portions 14 which are arranged at the lateral roof beams 6.

In order to be able to discharge any water, the transverse sealing portions 18 and the longitudinal sealing portions 20 include one water channel 26, respectively, being limited, on the one hand, by a sealing lip 28 which sealingly abuts against the respective lateral roof beam 6, and, on the other hand, by an inner sealing lip 30 which abuts against the roof element 2 or against an outer skin of the roof cassette 10 from below.

The invention claimed is:

1. A top for a convertible vehicle, comprising:
   at least one roof element configured to be displaceable between a closed position closing a roof opening and an open position for uncovering said roof opening and which, in relation to a vertical longitudinal center plane of the roof, is guided slidably in the longitudinal direction of the roof on both sides at one guide rail, respectively, said guide rail being arranged at a respective lateral roof beam,
   a rear roof cassette configured to be displaceable between an erected position for adjoining, in the rear, to the lateral roof beams in the longitudinal direction of the roof and a storage position that is lower with respect to the former position and the roof cassette accommodating the roof element in the open position thereof, as well as a sealing arrangement that seals a vehicle interior off with respect to a vehicle environment in the closed position of the roof element and in the erected position of the roof cassette,
   wherein the sealing arrangement, on both sides of the vertical longitudinal center plane of the roof, comprises one inner beam sealing portion, respectively, which is arranged at the relevant lateral roof beam on the side of the roof opening, and, in the rear, one cassette sealing portion, respectively, which is arranged at the roof cassette, and which comprises one transverse sealing portion running in the transverse direction of the roof and one longitudinal sealing portion running in the longitudinal direction of the roof, and
   wherein the cassette sealing portions, in the erected position of the roof cassette, abut against sealing surfaces of the respective lateral roof beam from below.

2. The top for a convertible vehicle according to claim 1, wherein the transverse sealing portions, in the erected position of the roof cassette, limit the respective lateral roof beams in the rear.

3. The top for a convertible vehicle according to claim 1, wherein the longitudinal sealing portions are designed in one piece with the respective transverse sealing portions.

4. The top for a convertible vehicle according to claim 1, wherein the longitudinal sealing portions, in the rear, merge into the respective transverse sealing portion at right angles, respectively, and in that the transverse sealing portions, on the outer side, in relation to the vertical longitudinal center plane of the roof, include one end portion, respectively, which extends downwards.

5. The top for a convertible vehicle according to claim 1, wherein the inner beam sealing portions are designed in one piece with a front beam sealing portion, respectively, which, in the longitudinal direction of the roof, limits the corresponding lateral roof beam in the rear and with an outer beam sealing portion, respectively, which is arranged at the outer side of the corresponding lateral roof beam and which is embodied for abutting against a door seal.

6. A top for a convertible vehicle, comprising at least one roof element configured to be displaceable between a closed position closing a roof opening and an open position for uncovering said roof opening and which, in relation to a vertical longitudinal center plane of the roof, is guided slidably in the longitudinal direction of the roof on both sides at one guide rail, respectively, said guide rail being arranged at a respective lateral roof beam, a rear roof cassette configured to be displaceable between an erected position for adjoining, in the rear, to the lateral roof beams in the longitudinal direction of the roof and a storage position that is lower with respect to the former position and the roof cassette accommodating the roof element in the open position thereof, wherein the guide rails comprise one beam guide portion, respectively, which is fixed to the relevant lateral roof beam, and one cassette guide portion, respectively, which is fixed to the roof cassette, and in that the beam guide portions, in their rear region, as viewed in the longitudinal direction of the roof, are respectively shorter than the corresponding lateral roof beam.

7. The top for a convertible vehicle according to claim 6, wherein, in the erected position of the roof cassette, the cassette guide portions directly adjoin the respective beam guide portions in the rear.

8. The top for a convertible vehicle according to claim 6, comprising a sealing arrangement that is arranged in the region of the roof opening and seals a vehicle interior off with respect to a vehicle environment in the closed position of the roof element and that, on both sides of the vertical longitudinal center plane of the roof, comprises one inner beam sealing portion, respectively, which is arranged at the relevant lateral roof beam on the side of the roof opening, and, in the rear, one cassette sealing portion, respectively, which is arranged at the roof cassette, wherein the cassette sealing portions comprise one transverse sealing portion running in the transverse direction of the roof and one longitudinal sealing portion, respectively, running in the longitudinal direction of the roof.

9. The top for a convertible vehicle according to claim 8, wherein the cassette sealing portions, in the erected position of the roof cassette, abut against sealing surfaces of the respective lateral roof beam from below.

10. The top for a convertible vehicle according to claim 8, wherein the longitudinal sealing portions, in the erected position of the roof cassette, are aligned with the respective inner beam sealing portions.

11. The top for a convertible vehicle according to claim 8, wherein the transverse sealing portions, in the erected position of the roof cassette, limit the respective lateral beams in the rear.

12. The top for a convertible vehicle according to claim 8, wherein the longitudinal sealing portions are designed in one piece with the respective transverse sealing portions.

13. The top for a convertible vehicle according to claim 8, wherein the longitudinal sealing portions, in the rear, merge into the respective transverse sealing portion at right angles, respectively, and in that the transverse sealing portions, on the outer side, in relation to the vertical longitudinal center plane of the roof, include one end portion, respectively, which extends towards the bottom.

14. The top for a convertible vehicle according to claim 8, wherein the inner beam sealing portions are designed in one piece with a front beam sealing portion, respectively, which, in the longitudinal direction of the roof, limits the corresponding lateral roof beam in the rear and with an outer beam sealing portion, respectively, which is arranged at the outer side of the corresponding lateral roof beam and which is embodied for abutting against a door or window seal.

* * * * *